US011222433B2

(12) United States Patent
Bae et al.

(10) Patent No.: US 11,222,433 B2
(45) Date of Patent: Jan. 11, 2022

(54) 3 DIMENSIONAL COORDINATES CALCULATING APPARATUS AND 3 DIMENSIONAL COORDINATES CALCULATING METHOD USING PHOTO IMAGES

(71) Applicant: CUPIX, INC., Gyeonggi-do (KR)

(72) Inventors: SeockHoon Bae, Seoul (KR); Jun Young Park, Seoul (KR)

(73) Assignee: CUPIX, INC., Gyeonggi-do (KR)

( * ) Notice: Subject to any disclaimer, the term of this patent is extended or adjusted under 35 U.S.C. 154(b) by 0 days.

(21) Appl. No.: 16/899,598

(22) Filed: Jun. 12, 2020

(65) Prior Publication Data

US 2020/0394809 A1   Dec. 17, 2020

(30) Foreign Application Priority Data

Jun. 14, 2019   (KR) .................. 10-2019-0070530

(51) Int. Cl.
| | |
|---|---|
| *G06T 7/521* | (2017.01) |
| *G06T 7/292* | (2017.01) |
| *G06T 7/246* | (2017.01) |
| *G06T 7/73* | (2017.01) |
| *G06T 7/00* | (2017.01) |
| *G06T 7/35* | (2017.01) |

(52) U.S. Cl.
CPC ............ *G06T 7/521* (2017.01); *G06T 7/0002* (2013.01); *G06T 7/246* (2017.01); *G06T 7/292* (2017.01); *G06T 7/35* (2017.01); *G06T 7/73* (2017.01); *G06T 7/97* (2017.01)

(58) Field of Classification Search
CPC ......... G06T 7/521; G06T 7/292; G06T 7/246; G06T 7/73; G06T 7/97; G06T 7/35; G06T 7/0002; G06T 2207/30244; G06T 7/593; G06T 7/30; G06T 2207/10004; G06T 2207/20068

See application file for complete search history.

(56) References Cited

U.S. PATENT DOCUMENTS

| | | | |
|---|---|---|---|
| 8,825,452 B2 | 9/2014 | Shono et al. | |
| 2019/0080466 A1* | 3/2019 | Mori | .............. G06T 7/593 |
| 2019/0114832 A1* | 4/2019 | Park | .............. G06T 17/20 |
| 2019/0195622 A1* | 6/2019 | Shimizu | .............. G06F 17/12 |
| 2019/0392609 A1 | 12/2019 | Bae | |

FOREIGN PATENT DOCUMENTS

| | | |
|---|---|---|
| JP | 2017191022 | 10/2017 |
| KR | 20160070012 | 6/2016 |
| KR | 101688746 | 12/2016 |
| KR | 20170142265 | 12/2017 |

* cited by examiner

*Primary Examiner* — Chan S Park
*Assistant Examiner* — Daniel C Chang
(74) *Attorney, Agent, or Firm* — JCIPRNET

(57) ABSTRACT

Provided are a method and apparatus for calculating three-dimensional coordinates using photographic images, and more particularly, a method and apparatus for calculating three-dimensional coordinates using photographic images in which a plurality of photographic images are analyzed to calculate the three-dimensional coordinate of a point commonly marked on the photographic images. By using the method and apparatus for calculating three-dimensional coordinates using photographic images captured by a camera, three-dimensional coordinates of arbitrary points marked on the photographic images can be easily calculated.

9 Claims, 3 Drawing Sheets

3 DIMENSIONAL COORDINATES CALCULATING APPARATUS AND 3 DIMENSIONAL COORDINATES CALCULATING METHOD USING PHOTO IMAGES

CROSS-REFERENCE TO RELATED APPLICATION

This application claims the benefit of Korean Patent Application No. 10-2019-0070530, filed on Jun. 14, 2019, in the Korean Intellectual Property Office, the disclosure of which is incorporated herein in its entirety by reference.

1. Field

The present disclosure relates to a method and apparatus for calculating three-dimensional coordinates using photographic images, and more particularly, to a method and apparatus for calculating three-dimensional coordinates using photographic images in which a plurality of photographic images are analyzed to effectively calculate the three-dimensional coordinates of measurement points commonly marked on the photographic images.

2. Description of the Related Art

In order to measure a distance between two points in a space, various measuring devices such as a tape measure, a laser distance sensor or the like may be used. When measuring a distance between two points in a space by using such a measuring device, a method of measuring and recording a distance between main points or representative points of a space is typically used.

It is practically difficult to measure three-dimensional coordinates of every point in a space or to measure a distance between two arbitrary points in a space due to constraints in the work environment or time constraints.

After completing survey of main points in a space, there is frequently the need to additionally measure a distance between two points in the space during a construction work, a building design work, or a remodeling work of a building. In such cases, visiting the construction site and doing survey or distance measurement again is very burdensome, inefficient, and decreases productivity.

Although it is possible to measure the absolute depth of the surrounding environment using equipment such as a three-dimensional scanner, it is difficult to use the equipment easily because the price thereof is very high. In addition, even when using a three-dimensional scanner, it is difficult to obtain a reliable level of three-dimensional coordinates of all points of a space due to limitations in a resolution of the equipment or space restraints.

If three-dimensional coordinates of an arbitrary point in a space could be obtained within an allowable error range by using photographic images captured using a camera and without expensive equipment such as a three-dimensional scanner, time and effort required for measurement of the space may be saved, and productivity may be significantly improved. For example, if a distance between two points can be calculated just by selecting two points required to be measured, from photographic images that are captured in advance, without visiting the site every time to survey required dimensions, productivity of architectural operations may be remarkably raised.

In addition, if measurement of the above-described type is possible, it may be possible to efficiently verify errors in the dimensions during a construction process of a building or survey a building in order to inspect safety of the building.

SUMMARY

One or more embodiments provide a method and apparatus for calculating three-dimensional coordinates using photographic images in which images captured by a camera are used and three-dimensional coordinates of arbitrary points marked on the images are calculated.

Additional aspects will be set forth in part in the description which follows and, in part, will be apparent from the description, or may be learned by practice of the presented embodiments of the disclosure.

According to an aspect of an embodiment, a three-dimensional coordinates calculation method using photographic images in which a plurality of photographic images captured by using a camera are used and a three-dimensional coordinate of a measurement point commonly marked on the plurality of photographic images is calculated includes: (a) receiving, by a first photographic image coordinate module, the input of a coordinate of the measurement point marked on a first photographic image from among the plurality of photographic images, the coordinate on the first photographic image, as a first photographic image coordinate; (b) designating, by a second photo designation module, a second photographic image on which the measurement point is marked; (c) achieving, by a camera information module, a camera direction corresponding to a direction in which the plurality of photographic images are captured and a camera position corresponding to a coordinate of a projection central point, as camera information; (d) calculating, by an image plane calculation module, a first image plane and a second image plane on which the first photographic image and the second photographic image are projected in a virtual three-dimensional space, respectively, by using camera information corresponding to the first photographic image and the second photographic image; (e) calculating, by a projection point calculation module, a three-dimensional coordinate of a first projection point corresponding to a position of the first image plane on which the measurement point is marked by using the first photographic image coordinate; (f) calculating, by a first projection straight line calculation module, a first projection straight line connecting the first projection point of the first image plane with a camera position of the camera information corresponding to the first photographic image; (g) calculating, by an epi line calculation module, an epipolar line which is the first projection straight line projected on the second image plane; (h) calculating, by a pixel comparison module, a three-dimensional coordinate of a second projection point corresponding to the first projection point on the path of the epipolar line by comparing pixels of the first photographic image with pixels of the second photographic image; (i) calculating, by a second projection straight line calculation module, a second projection straight line connecting the second projection point of the second image plane with a camera position of the camera information corresponding to the second photographic image; and (j) determining, by a measurement point calculation module, a coordinate of a point inside a region of which a distance with respect to the first projection straight line and the second projection straight line is minimized, as a three-dimensional coordinate of the measurement point.

According to another aspect of an embodiment, A three-dimensional coordinates calculation apparatus using photographic images in which a plurality of photographic images captured by using a camera are used and a three-dimensional coordinate of a measurement point commonly marked on the plurality of photographic images is calculated, the three-dimensional coordinates calculating apparatus including: a first photographic image coordinate module configured to receive, as a first photographic image coordinate, the input of a coordinate of the measurement point marked on the first photographic image from among the plurality of photographic images, the coordinate on the first photographic image; a second photo designation module configured to designate a second photographic image on which the measurement point is marked, from among the plurality of photographic images; a camera information module configured to achieve, as camera information, a camera direction corresponding to a direction in which the plurality of photographic images are captured and a camera position corresponding to the coordinate of a projection central point; an image plane calculation module configured to calculate a first image plane and a second image plane on which the first photographic image and the second photographic image are projected respectively in a virtual three-dimensional space by using camera information corresponding to the first photographic image and the second photographic image; a projection point calculation module configured to calculate a three-dimensional coordinate of a first projection point corresponding to a position of the first image plane on which the measurement point is marked, by using the first photographic image coordinate; a first projection straight line calculation module configured to calculate a first projection straight line connecting the first projection point of the first image plane with camera position of the camera information corresponding to the first photographic image; an epi line calculation module configured to calculate an epipolar line which is the first projection straight line projected on the second image plane; a pixel comparison module configured to calculate a three-dimensional coordinate of a second projection point corresponding to the first projection point on the path of the epipolar line by comparing pixels of the first photographic image with pixels of the second photographic image; a second projection straight line calculation module configured to calculate a second projection straight line connecting the second projection point of the second image plane with a camera position of camera information corresponding to the second photographic image; and a measurement point calculation module configured to determine, as a three-dimensional coordinate of the measurement point, a coordinate of a point inside a region of which a distance with respect to the first projection straight line and the second projection straight line is minimized.

According to one or more embodiments, a three-dimensional coordinates calculation apparatus using photographic images wherein, the camera information module calculates the camera information corresponding to the plurality of photographic images by using a computer vision structure from motion (SfM) method.

According to one or more embodiments, a three-dimensional coordinates calculation apparatus using photographic images wherein, the camera information module calculates the camera information corresponding to the plurality of photographic images by using measurement values of an inertial measurement unit (IMU) stored together when the plurality of photographic images are captured.

According to one or more embodiments, a three-dimensional coordinates calculation apparatus using photographic images wherein, the measurement point calculation module determines, as a three-dimensional coordinate of the measurement point, a coordinate of a point of which the distance with respect to each of the first projection straight line and the second projection straight line is equal and is minimized.

According to one or more embodiments, a three-dimensional coordinates calculation apparatus using photographic images wherein, the pixel comparison module calculates a feature descriptor with respect to the pixels of the first photographic image and second photographic image and calculates a three-dimensional coordinate of the second projection point based on feature descriptor similarity.

According to one or more embodiments, a three-dimensional coordinates calculation apparatus using photographic images wherein, the pixel comparison module sets a patch surrounding the first projection point of the first photographic image and a patch surrounding pixels on the epipolar line of the second photographic image to determine a pixel having the highest image patch comparison results similarity as the three-dimensional coordinate of the second projection point.

According to one or more embodiments, a three-dimensional coordinates calculation apparatus using photographic images wherein, a camera connection straight line calculation module calculates a camera connection straight line connecting a camera position of the first photographic image with a camera position of the second photographic image and calculates second epipole at which the camera connection straight line meets the second image plane, wherein the pixel comparison module performs calculating to search pixels starting from the second epipole on the epipolar line to find a three-dimensional coordinate of the second projection point.

According to one or more embodiments, a three-dimensional coordinates calculation apparatus using photographic images wherein, the second photo designation module designates, from among the plurality of photographic images, a photographic image which has the shortest distance from the first photographic image in a virtual three-dimensional space, as the second photographic image.

According to one or more embodiments, a three-dimensional coordinates calculation apparatus using photographic images wherein, the second photo designation module designates, as the second photographic image, a photographic image of which an angle between a straight line connecting a camera position of camera information of the plurality of photographic images with a camera position of the first photographic image and the first projection straight line is closest to 45 degrees.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, a three-dimensional coordinates calculating method using photographic images and a three-dimensional coordinates calculating apparatus using photographic images, according to embodiments of the present disclosure, will be described with reference to the attached drawings.

Figure 1:
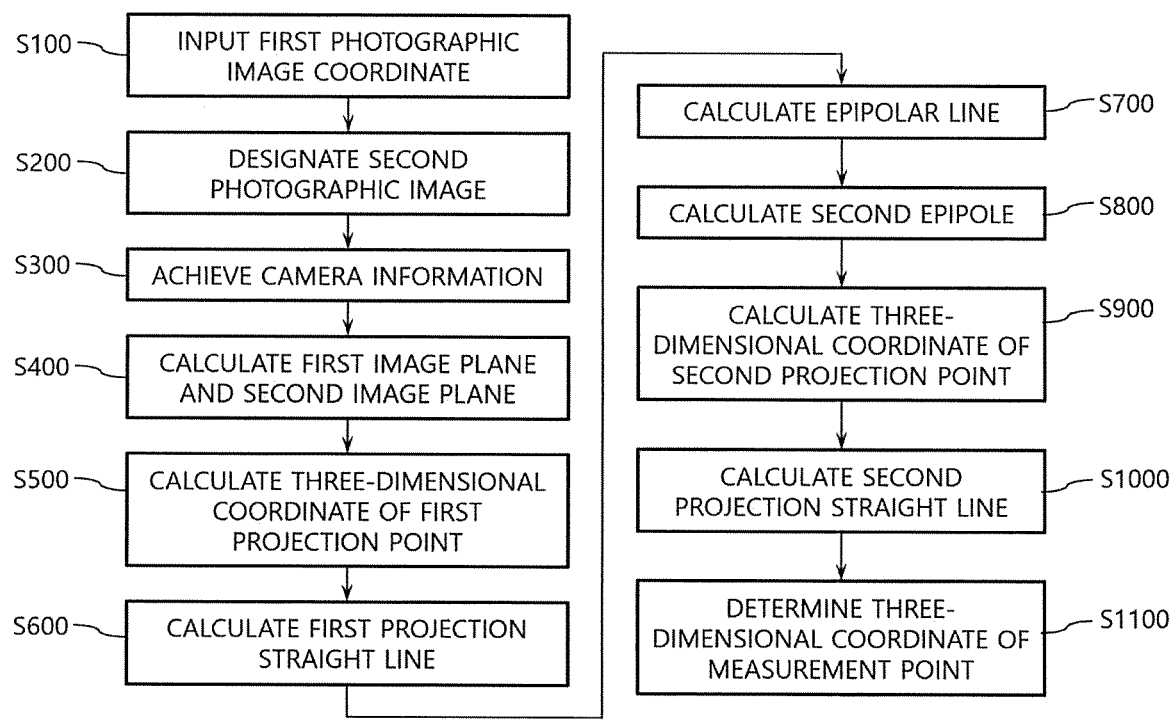
FIG. 1 is a block diagram of a three-dimensional coordinates calculating apparatus using photographic images, according to an embodiment of the present disclosure.
Figure 2:
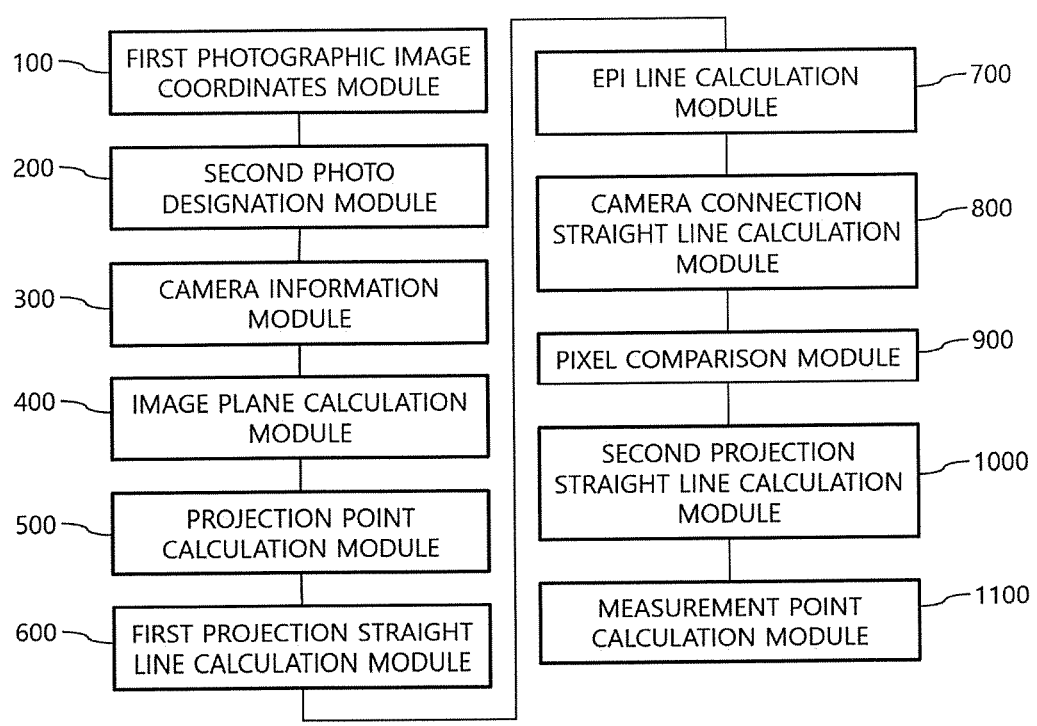
FIG. 2 is a flowchart of a three-dimensional coordinates calculating method using photographic images, according to an embodiment of the present disclosure.

FIG. 1 is a block diagram of a three-dimensional coordinates calculating apparatus using photographic images, according to an embodiment of the present disclosure, and FIG. 2 is a flowchart of a three-dimensional coordinates calculating method using photographic images, according to an embodiment of the present disclosure.

A method and apparatus for calculating three-dimensional coordinates using photographic images according to the present disclosure use a plurality of photographic images captured by a camera to calculate the three-dimensional coordinates of a measurement point M marked thereon. When three-dimensional coordinates of the measurement point M commonly marked on a plurality of photographic images are calculated, for example, a distance between points marked on a photographic image can be calculated by using the photographic image alone.

Referring to FIG. 1, the three-dimensional coordinates calculating apparatus using photographic images according to an embodiment of the present disclosure includes a first photographic image coordinates module 100, a second photo designation module 200, a camera information module 300, an image plane calculation module 400, a projection point calculation module 500, a first projection straight line calculation module 600, an epi line calculation module 700, a pixel comparison module 900, a second projection straight line calculation module 1000, and a measurement point calculation module 1100.

The first photographic image coordinates module 100 receives the input of a coordinate of a measurement point M marked on a first photographic image S1, from among a plurality of photographic images, as a first photographic image coordinate, wherein the coordinate is on the first photographic image S1 (operation (a); S100). That is, the first photographic image coordinate module 100 receives the input of a photographic image coordinate of the measurement point M, marked on any one photographic image (first photographic image S1) from among a plurality of photographic images, in the form of a two-dimensional coordinate of the measurement point M. Various input devices may be used to receive the input of a first photographic image coordinate. In one embodiment, the first photographic image coordinates module 100 may receive the input of the first photographic image coordinate through a user's clicking on the measurement point M on the first photographic image S1 displayed on a display device of a computer by using a mouse. When a user inputs the coordinate of the measurement point M marked on a photographic image (first photographic image S1) as described above, the first photographic image coordinates module 100 receives and stores, as the first photographic image coordinate, the two-dimensional coordinate of the measurement point M on the first photographic image S1.

The second photo designation module 200 designates a second photographic image S2, which is another photographic image on which the measurement point M is marked, from among the photographic images (operation (b); S200). That is, the second photo designation module 200 designates another photographic image on which the measurement point M is marked wherein the measure point M is selected by the user in the first photographic image. The second photo designation module 200 may designate the second photographic image S2 by using various methods. When a user clicks on, from among a plurality of photographic images, at least one image on which the measurement point M is marked, the second photo designation module 200 may designate the corresponding photographic image as the second photographic image S2. According to circumstances, the second photo designation module 200 may automatically select, from among a plurality of photographic image, a photographic image which is highly likely to have the measurement point M marked thereon, as the second photographic image S2. The specific method for the second photo designation module 200 to automatically designate the second photographic image S2 will be described later.

The present disclosure is characterized in that once a user designates the measurement point M on the first photographic image S1, there is no need to designate the measurement point M on the second photographic image S2. By the method described later, according to the present disclosure, the coordinate of the measurement point M marked on the second photographic image S2 may automatically be calculated.

The camera information module 300 may achieve the position and direction of a camera that captures images on which the measurement point M is marked as camera information (operation (c), S300). The position and direction of the camera when the camera captures an image is defined as camera information. The camera positions F1 and F2 of the camera information are each the same as the coordinate of the projection center point of the camera.

The camera information module 300 may achieve camera information by using various methods.

First, the camera information module 300 may achieve camera information by using a computer vision structure from motion (SfM) method. The computer vision SfM method is a technique of calculating the three-dimensional coordinates and direction of a camera when the camera is used to take pictures by analyzing just the photographic images of the pictures.

Second, when capturing a photographic image by using a camera, camera information may be calculated based on measurement values or variations of measurement values according to time obtained using various types of sensors such as an inertial measurement unit (IMU), an acceleration sensor, a geomagnetic sensor, an angular displacement sensor or the like. For example, a variation of a displacement may be calculated by integrating an acceleration twice, and thus, camera information may be calculated accurately or quickly by using values calculated as described above.

Camera information may also be achieved by using the computer vision SfM method and measurement values of various sensors in combination.

According to circumstances, a separate apparatus may store the position and direction of a camera, measured each time when a photographic image is captured, and the camera information module 300 may use camera information stored as above.

Figure 3:
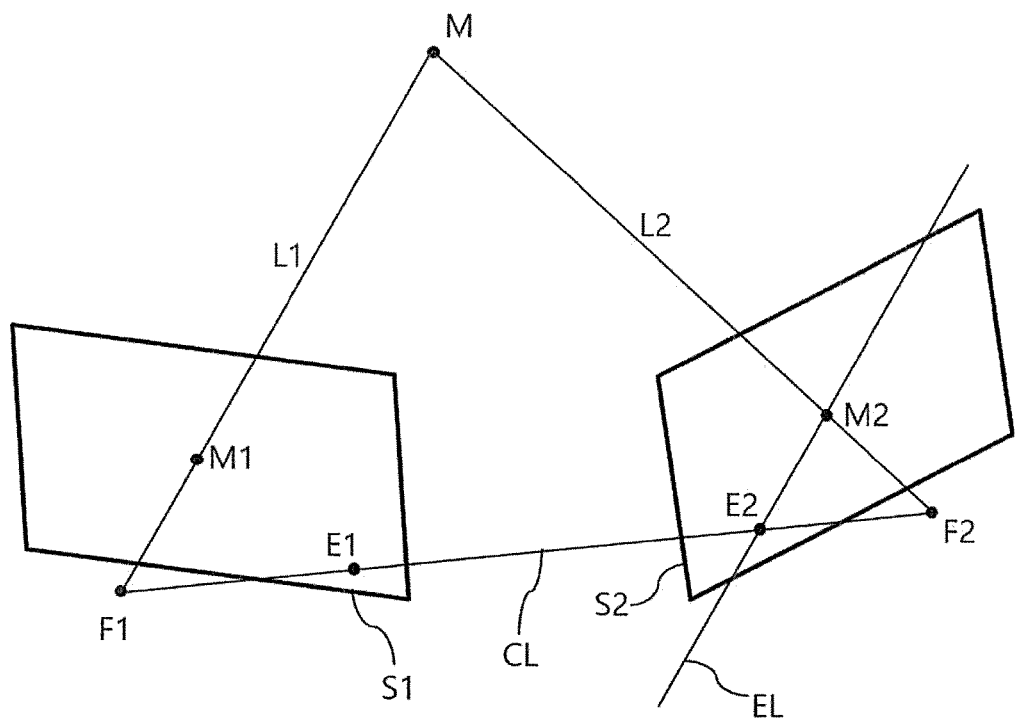
FIG. 3 is a diagram for describing operation of the apparatuses and method according to embodiments of the present disclosure.

The image plane calculation module 400 calculates a first image plane and a second image plane on which the first photographic image S1 and the second photographic image S2 are projected in a virtual three-dimensional space, respectively, by using the camera information corresponding to the first photographic image S1 and the second photographic image S2 (operation (d); S400). The three-dimensional relationship between the camera position and the first photographic image S1 and the second photographic image S2 is shown in FIG. 3. The image plane calculation module 400, considering the camera information achieved by the camera information module 300 and the relative positions and sizes of the first photographic image S1 and second photographic image S2, calculates the first image plane and the second image plane on which the first photographic image S1 and the second photographic image S2 are to be projected from the camera position (focus of the camera). That is, the image plane calculation module 400 calculates the equations of the image planes corresponding to the first photographic image S1 and the second photographic image S2.

The projection point calculation module 500 calculates, by using the first photographic image coordinate, the three-dimensional coordinate of the first projection point M1 corresponding to a position of the first image plane on which the measurement point M is to be marked, (operation (e); S500). Because the first image plane is identified by the image plane calculation module 400 and the first photographic image coordinate is identified by the first photographic image coordinates module 100, the projection point calculation module 500 may calculate the three-dimensional coordinate of the first projection point M1, that is, the measurement point M projected on the first image plane. The relationship among the position of the camera of the first photographic image S1, the measurement point M, and the first projection point M1 is as shown in FIG. 3.

In one embodiment, a projection surface of a camera corresponds to an image sensor of a camera. In digital cameras, for example, a complementary metal-oxide semiconductor (CMOS) image sensor or a charge-coupled device (CCD) image sensor corresponds to a projection surface. Relative positions of a projection central point and a projection surface and the size of the projection surface of a camera correspond to camera intrinsic parameters, and thus, values of the relative positions of a projection central point and a projection surface and the size of the projection surface may be obtained from information about the camera. By using the camera information, the size and location of the projection surface, and the photographic image coordinate of the measurement point M, the projection point calculation module 500 may calculate the three-dimensional coordinate of the first projection point M1.

The image plane calculation module 400 and the projection point calculation module 500 may calculate, considering relative positions of the projection central point and projection surface of a camera, and image planes, relative positions and coordinates by appropriately enlarging the photographic image proportionally or symmetric-rotating with respect to the projection central point.

The first projection straight line calculation module 600 may calculate a first projection straight line L1 connecting the first projection point M1 of the first image plane with the position (first camera position F1) of a camera of camera information corresponding to the first photographic image S1 (operation (f); S600). Because the first camera position F1 and the three-dimensional coordinate of first projection point M1 are known, the first projection straight line calculation module 600 may calculate the first projection straight line L1. The first projection straight line L1 as described above passes through the measurement point M in a three-dimensional space as shown in FIG. 3.

The epi line calculation module 700 may calculate an epipolar line EL, that is, the first projection straight line L1 projected on the second image plane (operation (g); S700). Because the first projection straight line L1 is calculated by the first projection straight line calculation module 600 and the second image plane is calculated by the image plane calculation module 400, the epi line calculation module 700 may calculate the epipolar line EL, that is, the first projection straight line L1 projected on the second image plane.

In this state, the pixel comparison module 900 compares pixels of the first photographic image S1 with pixels of the second photographic image S2 to calculate the three-dimensional coordinate of the second projection point M2 corresponding to the first projection point M1 on the path of the epipolar line EL (operation (h); S900). Because the first photographic image S1 and the second photographic image S2 are photographic images captured with respect to the same object surrounding the measurement point M, when pixels of the first photographic image S1 are compared with pixels of the second photographic image S2, the pixel comparison module 900 determines a pixel of the second photographic image S2 corresponding to the first projection point M1 and determines the pixel as the second projection point M2 to calculate the three-dimensional coordinate of second projection point M2. In this regard, the pixel comparison module 900 confirms, only with respect to pixels located on the epipolar line EL of the second photographic image S2, whether a pixel corresponds to the first projection point M1, so as to determine the pixel of the second photographic image S2 corresponding to the first projection point M1 and, by using the pixel, the three-dimensional coordinate of the second projection point M2 can be more accurately calculated.

The pixel comparison module 900 may determine the second projection point M2 corresponding to the first projection point M1 by using various known methods. First, the pixel comparison module 900 may calculate a feature descriptor to search for a point that has the highest similarity. The pixel comparison module 900 may calculate a feature descriptor with respect to pixels on the epipolar line EL to determine, as the second projection point M2, a pixel that has the highest feature descriptor similarity to the first projection point M1. The pixel comparison module 900 may search for the second projection point M2 by using an image patch comparison method. The pixel comparison module 900 may determine the second projection point M2 in such a manner that a patch is set around the first projection point M1 of first photographic image S1 and is compared with the patches around the epipolar line EL of the second photographic image S2 to search for a point having the highest patch similarity. In one or more embodiments, the pixel comparison module 900 may use various other methods in which different images are compared to find a corresponding identical point.

In this regard, a camera connection straight line calculation module 800 may be used to reduce the time during which the pixel comparison module 900 calculates. The camera connection straight line calculation module 800 calculates a camera connection straight line CL connecting the first camera position F1 with the second camera position F2, and a second epipole E2 at which the camera connection straight line CL meets the second image plane (operation (k); S800). By using the second epipole E2 calculated as described above, the pixel comparison module 900 compares the pixels of the second photographic image S2 along the epipolar line EL starting from the second epipole E2 with the first projection point M1 to find the second projection point M2.

In one or more embodiments, when the second photo designation module 200 designates the second photographic image S2 in operation (b) described above, the second photographic image S2 may be automatically designated by the following method without receiving the input of the second photographic image S2 from the user.

First, the second photo designation module 200 may designate, from among a plurality of photographic images, a photographic image which has the shortest distance from the first photographic image S1 in a virtual three-dimensional space, as a second photographic image. The shorter the distance of a photographic image with respect to the first photographic image S1, the higher the probability that the same measurement point M is also taken on the photographic image. Therefore, the corresponding photographic image is designated as the second photographic image S2 to measure the coordinate of the measurement point M.

In other methods according to one or more embodiments, a photographic image of which an angle between a straight line connecting a camera position of camera information of photographic images with the camera position of the first photographic image S1 and the first projection straight line L1 is closest to 45 degrees, may be designated as the second photographic image S2 by the second photo designation module 200. When the above criteria are applied, there is a high possibility that the directions of the cameras capturing the first photographic image S1 and the second photographic image S2 are 90 degrees apart from each other. The accuracy for the calculation of the three-dimensional coordinate of measurement point M can be increased by using a photographic image taken with the largest angle difference for the same measurement point M.

In addition to the above-described method, various other criteria for the second photo designation module 200 to designate the second photographic image S2 may be used, and two or more methods can be used in combination.

When the three-dimensional coordinate of the second projection point M2 is calculated in this manner, the second projection straight line calculation module 1000 may calculate a second projection straight line L2 connecting the second projection point M2 with the camera position (second camera position F2) of the camera information corresponding to the second photographic image S2 ((i) operation; S1000). Because the second projection point M2 and the second camera position F2 are known, the second projection straight line calculation module 1000 may calculate the equation of the second projection straight line L2 connecting the second projection point M2 with the second camera position F2.

Because the first projection straight line L1 and the second projection straight line L2 are calculated through the above-described operation, the measurement point calculation module 1100 may determine, as the three-dimensional coordinate of the measurement point M, the coordinate of a point inside a region of which the distance with respect to the first projection straight line L1 and the second projection straight line L2 is minimized (operation (j); S1100).

Theoretically, the first projection straight line L1 and the second projection straight line L2 cross each other at the measurement point M. Therefore, the measurement point calculation module 1100 determines the coordinate of the point where the first projection straight line L1 and the second projection straight line L2 intersect as the three-dimensional coordinate of the measurement point M. In the case where the first projection straight line L1 and the second projection straight line L2 are calculated by using images captured by a camera, the first projection straight line L1 and the second projection straight line L2 may not intersect due to various errors. In this case, the measurement point calculation module 1100 may determine the coordinate of a point (a point that divides a line segment connecting the first projection straight line L1 with the second projection straight line L2 in the shortest distance) of which distances with respect to the first projection straight line L1 and the second projection straight line L2 are the same and are shortest. According to circumstances, a plurality of different photographic images are each designated as the second photographic image S2, and the operations after operation (b) are repeatedly performed to calculate a plurality of second projection straight lines L2, and a point inside a region of which a distance with respect to the first projection straight line L1 and the second projection straight line L2 is minimized, may be determined as the three-dimensional coordinate of the measurement point M by the measurement point calculation module 1100. The measurement point calculation module 1100 may determine the coordinate of the measurement point M by using various statistical methods using representative values such as an average, an intermediate value, or a median value. Also, the measurement point calculation module 1100 may use a method of determining the coordinate of the measurement point M in which an outlier that exceeds allowable limits of error is excluded, based on normal distribution and standard deviation.

When the coordinates of two measurement points M are calculated using the apparatus and method for calculating three-dimensional coordinates using photographic images as described above, the distance between the measurement points M can be easily calculated.

When the apparatus and method for calculating three-dimensional coordinates using photographic images of the present disclosure are used for two different measurement points M, the three-dimensional coordinate of each measurement point can be calculated and the relative distance between the two points can be calculated. When a scale that converts a relative distance into an absolute distance is input and used, the absolute distance between two measurement points M may be easily calculated.

When the method as described above is used, it is possible to significantly reduce the labor and costs of measuring a three-dimensional coordinate for an arbitrary point in a space or calculating a distance between two points. For example, instead of measuring a distance between measurement points M by using a measurement device such as a tape measure by visiting the site every time, a distance between arbitrary points may be measured just by using previously captured pictures. According to embodiments of the present disclosure, each time when measurement is required, there is no need to visit the site again, and distance measurement may be performed using just previously captured pictures. In addition, because just capturing photographic images simply allows measurement of a distance between arbitrary points, distances between two points that are additionally needed to be measured during an ongoing project may be measured easily without revisiting the site.

As described above, according to the present disclosure, time and efforts may be significantly reduced when conducting tasks such as architectural design or remodeling are performed and ultimately, productivity may be increased.

In addition, the present disclosure may also be used in verifying an error of a construction work process. By storing repeatedly captured photographic images of a construction site in a construction work process, changes in dimensions of the construction site according to the construction process may be detected according to the present disclosure. In the event a problem occurs after completion of the construction, whether there was an error in the dimensions in the process of construction may be easily inspected just by using the captured photographic images of the construction site.

While the present disclosure has been described with reference to embodiments, the scope of the present disclosure is not limited to the above described and illustrated structures.

For example, although the use of photographic images captured using a camera has been described above, according to the present disclosure, an element for achieving photographic images is not limited to a typical digital camera. Photographic images captured using a three-dimensional scanner may also be used for implementation of the present disclosure. Like digital cameras, a three-dimensional scanner obtains a photographic image of a photographing subject, and obtains shape information of a three-dimensional object by measuring depths of points of interest in each pixel of the corresponding image. According to three-dimensional information measured using a three-dimensional scanner, shapes are crushed at edge portions where surfaces meet, and thus, measuring a distance may be difficult or the measurement may not be accurate. Here, by applying the present disclosure to photographic image information provided using the three-dimensional scanner, the coordinate of the measurement point M or the distance between measurement points M may be calculated effectively. That is, embodiments of the present disclosure may be used as a supplement or an alternative to a result of a three-dimensional scanner to further improve distance measurement performance.

Also, embodiments in which a feature descriptor or an image patch is used in the process in which the pixel comparison module 900 searches for the second projection point M2 corresponding the first projection point M1 in the second photographic image S2 have been described. However, other methods may also be available.

Also, embodiments in which, in (k) operation, the camera connection straight line calculation module 800 verifies whether pixels on the epipolar line EL starting from the second epipole E2 correspond to the first projection point M1 have been described. However, in other embodiments, the camera connection straight line calculation module 800 may not be used. Various other methods can also be used in which the number of comparisons with other calculations is reduced and the pixels of the first photographic image S1 are quickly compared with the pixels of the second photographic image S2 to search for the second projection point M2.

A method and apparatus for calculating three-dimensional coordinates using photographic images according to embodiments of the present disclosure, three-dimensional coordinates of arbitrary points marked on photographic images captured by a camera can be easily calculated.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A three-dimensional coordinates calculation method, adapted to a computer configured to function as a first photographic image coordinate module, a second photo designation module, a camera information module, an image plane calculation module, a projection point calculation module, a first projection straight line calculation module, an epi line calculation module, a pixel comparison module, a second projection straight line calculation module, and a measurement point calculation module, using photographic images in which a plurality of photographic images captured by using a camera are used and a three-dimensional coordinate of a measurement point commonly marked on the plurality of photographic images is calculated, the three-dimensional coordinates calculating method comprising:

(a) receiving, by the first photographic image coordinate module, the input of a coordinate of the measurement point marked on a first photographic image from among the plurality of photographic images, the coordinate on the first photographic image, as a first photographic image coordinate;

(b) designating, by the second photo designation module, a second photographic image on which the measurement point is marked;

(c) achieving, by the camera information module, a camera direction corresponding to a direction in which the plurality of photographic images are captured and a camera position corresponding to a coordinate of a projection central point, as camera information;

(d) calculating, by the image plane calculation module, a first image plane and a second image plane on which the first photographic image and the second photographic image are projected in a virtual three-dimensional space, respectively, by using camera information corresponding to the first photographic image and the second photographic image;

(e) calculating, by the projection point calculation module, a three-dimensional coordinate of a first projection point corresponding to a position of the first image plane on which the measurement point is marked by using the first photographic image coordinate;

(f) calculating, by the first projection straight line calculation module, a first projection straight line connecting the first projection point of the first image plane with a camera position of the camera information corresponding to the first photographic image;

(g) calculating, by the epi line calculation module, an epipolar line which is the first projection straight line projected on the second image plane;

(h) calculating, by the pixel comparison module, a three-dimensional coordinate of a second projection point corresponding to the first projection point on the path of the epipolar line by comparing pixels of the first photographic image with pixels of the second photographic image;

(i) calculating, by the second projection straight line calculation module, a second projection straight line connecting the second projection point of the second image plane with a camera position of the camera information corresponding to the second photographic image; and (j) determining, by the measurement point calculation module, a coordinate of a point inside a region of which a distance with respect to the first projection straight line and the second projection straight line is minimized, as a three-dimensional coordinate of the measurement point, wherein, in operation (b), the second photo designation module designates, from among the plurality of photographic images, a photographic image which has the shortest distance from the first photographic image in the virtual three-dimensional space, as the second photographic image.

2. The three-dimensional coordinates calculation method of claim 1, wherein, in operation (c),
the camera information module calculates camera information corresponding to the plurality of photographic images by using a computer vision structure from motion (SfM) method.

3. The three-dimensional coordinates calculation method of claim 1, wherein, in operation (c),
the camera information module calculates camera information corresponding to the plurality of photographic images by using measurement values of an inertial measurement unit (IMU) stored together when the plurality of photographic images are captured.

4. The three-dimensional coordinates calculation method of claim 1, wherein, in operation (j),
the measurement point calculation module determines, as a three-dimensional coordinate of the measurement point, a coordinate of a point of which the distance with respect to each of the first projection straight line and the second projection straight line is equal and minimized.

5. The three-dimensional coordinates calculation method of claim 1, wherein, in operation (h),
the pixel comparison module calculates a feature descriptor with respect to the pixels of the first photographic image and second photographic image and calculates a three-dimensional coordinate of the second projection point based on feature descriptor similarity.

6. The three-dimensional coordinates calculation method of claim 1, wherein, in (h) operation,
the pixel comparison module sets a patch surrounding the first projection point of the first photographic image and a patch surrounding pixels on the epipolar line of the second photographic image to determine a pixel having the highest image patch comparison results similarity as the three-dimensional coordinate of the second projection point.

7. The three-dimensional coordinates calculation method of claim 5, further comprising
(k) calculating, by a camera connection straight line calculation module, a camera connection straight line connecting a camera position of the first photographic image with a camera position of the second photographic image and a second epipole at which the camera connection straight line meets the second image plane, wherein
in operation (h), the calculating is performed to search pixels starting from the second epipole on the epipolar line to find a three-dimensional coordinate of the second projection point.

8. The three-dimensional coordinates calculation method of claim 6, further comprising
(k) calculating, by a camera connection straight line calculation module, a camera connection straight line connecting a camera position of the first photographic image with a camera position of the second photographic image and a second epipole at which the camera connection straight line meets the second image plane, wherein
in operation (h), the calculating is performed to search pixels starting from the second epipole on the epipolar line to find a three-dimensional coordinate of the second projection point.

9. A three-dimensional coordinates calculation method, adapted to a computer configured to function as a first photographic image coordinate module, a second photo designation module, a camera information module, an image plane calculation module, a projection point calculation module, a first projection straight line calculation module, an epi line calculation module, a pixel comparison module, a second projection straight line calculation module, and a measurement point calculation module, using photographic images in which a plurality of photographic images captured by using a camera are used and a three-dimensional coordinate of a measurement point commonly marked on the plurality of photographic images is calculated, the three-dimensional coordinates calculating method comprising:
(a) receiving, by the first photographic image coordinate module, the input of a coordinate of the measurement point marked on a first photographic image from among the plurality of photographic images, the coordinate on the first photographic image, as a first photographic image coordinate;
(b) designating, by the second photo designation module, a second photographic image on which the measurement point is marked;
(c) achieving, by the camera information module, a camera direction corresponding to a direction in which the plurality of photographic images are captured and a camera position corresponding to a coordinate of a projection central point, as camera information;
(d) calculating, by the image plane calculation module, a first image plane and a second image plane on which the first photographic image and the second photographic image are projected in a virtual three-dimensional space, respectively, by using camera information corresponding to the first photographic image and the second photographic image;
(e) calculating, by the projection point calculation module, a three-dimensional coordinate of a first projection point corresponding to a position of the first image plane on which the measurement point is marked by using the first photographic image coordinate;
(f) calculating, by the first projection straight line calculation module, a first projection straight line connecting the first projection point of the first image plane with a camera position of the camera information corresponding to the first photographic image;
(g) calculating, by the epi line calculation module, an epipolar line which is the first projection straight line projected on the second image plane;
(h) calculating, by the pixel comparison module, a three-dimensional coordinate of a second projection point corresponding to the first projection point on the path of the epipolar line by comparing pixels of the first photographic image with pixels of the second photographic image;
(i) calculating, by the second projection straight line calculation module, a second projection straight line connecting the second projection point of the second image plane with a camera position of the camera information corresponding to the second photographic image; and
(j) determining, by the measurement point calculation module, a coordinate of a point inside a region of which a distance with respect to the first projection straight line and the second projection straight line is minimized, as a three-dimensional coordinate of the measurement point,
wherein, in operation (b), the second photo designation module designates, as the second photographic image, a photographic image of which an angle between a straight line connecting a camera position of camera information of the plurality of photographic images with a camera position of the first photographic image and the first projection straight line is closest to 45 degrees.

* * * * *